(12) United States Patent
Layard et al.

(10) Patent No.: US 7,631,254 B2
(45) Date of Patent: Dec. 8, 2009

(54) AUTOMATED E-LEARNING AND PRESENTATION AUTHORING SYSTEM

(76) Inventors: Gordon Peter Layard, 14 Myola Road, Newport, NSW (AU) 2106; Andrew Poulos, P.O. Box 446, Rozelle, NSW (AU) 2039

( * ) Notice: Subject to any disclaimer, the term of this patent is extended or adjusted under 35 U.S.C. 154(b) by 17 days.

(21) Appl. No.: 10/597,967

(22) PCT Filed: Apr. 29, 2005

(86) PCT No.: PCT/AU2005/000600

§ 371 (c)(1),
(2), (4) Date: May 21, 2007

(87) PCT Pub. No.: WO02/25483

PCT Pub. Date: Mar. 28, 2002

(65) Prior Publication Data

US 2007/0209004 A1 Sep. 6, 2007

(30) Foreign Application Priority Data

May 17, 2004 (AU) .............................. 2004902591

(51) Int. Cl.
*G06F 17/00* (2006.01)
(52) U.S. Cl. .................. 715/202; 715/234; 715/730; 434/362; 434/350; 434/323; 434/118; 434/169
(58) Field of Classification Search .................. 715/210, 715/205, 230, 234; 434/156–159, 362
See application file for complete search history.

(56) References Cited

U.S. PATENT DOCUMENTS 6,175,841 B1 * 1/2001 Loiacono .................... 715/205
6,315,572 B1 * 11/2001 Owens et al. ............... 434/322
6,884,074 B2 * 4/2005 Theilmann .................. 434/118
6,988,138 B1 * 1/2006 Alcorn et al. ............... 709/225

(Continued)

FOREIGN PATENT DOCUMENTS

WO    WO 02/25483    * 3/2002

OTHER PUBLICATIONS

"From Text to Test, Automatically—An Evaluation of a Computer Cloze-Test Generator" David Coniam HKJAL vol. 3, No. 1, Jun. 1998 pp. 41-60.*

(Continued)

*Primary Examiner*—Doug Hutton
*Assistant Examiner*—Benjamin J Smith

(57) ABSTRACT

A software system which automates the process of creating electronic screen based product, such as e-learning tutorials and electronic presentations, by analysing source content documents, generating screens and dynamically inserting relevant graphics onto resulting screens. There is no necessity for the user to tag on the source document where a screen should begin or end. The system can also automatically create interactive activities that the tutorial student can complete and be assessed by. The system represents a four step procedure from the point of view of the user. Firstly the user has the option of setting preferences, box (34). Secondly, the user nominates the source document(s) they wish to be converted, box (36). Thirdly, once the system has generated the screens, box (38) through to box (60), the user can edit the resulting screens, box (62). Finally, the user requests the system to publish the screens, box (62), to a nominated industry standard format, box (66).

15 Claims, 8 Drawing Sheets

U.S. PATENT DOCUMENTS

| | | | |
|---|---|---|---|
| 7,029,280 B2* | 4/2006 | Krebs et al. | 434/118 |
| 7,062,220 B2* | 6/2006 | Haynes et al. | 434/353 |
| 7,397,954 B2* | 7/2008 | Katsuyama et al. | 382/199 |
| 2003/0073063 A1* | 4/2003 | Dattaray et al. | 434/350 |
| 2003/0152904 A1* | 8/2003 | Doty, Jr. | 434/350 |
| 2003/0179932 A1* | 9/2003 | Katsuyama et al. | 382/190 |
| 2004/0010439 A1* | 1/2004 | Siders et al. | 705/10 |
| 2004/0014013 A1* | 1/2004 | Diesel et al. | 434/118 |
| 2004/0076342 A1* | 4/2004 | Wolff et al. | 382/294 |
| 2004/0102958 A1* | 5/2004 | Anderson, IV | 704/4 |
| 2005/0037324 A1* | 2/2005 | Sumimoto | 434/322 |
| 2005/0079477 A1* | 4/2005 | Diesel et al. | 434/350 |
| 2005/0132207 A1* | 6/2005 | Mourad | 713/189 |
| 2005/0204337 A1* | 9/2005 | Diesel et al. | 717/113 |
| 2006/0068368 A1* | 3/2006 | Mohler et al. | 434/362 |
| 2006/0134593 A1* | 6/2006 | Kalous et al. | 434/350 |

OTHER PUBLICATIONS

"A Preliminary Inquiry Into Using Corpus Word Frequency Data in the Automatic Generation of English Language Cloze Tests"; Coniam auto generate cloze tests.pdf; Calico Journal vol. 14 Num. 2-4 p. 15-34.*

"Measuring Non-native Speakers' Proficiency of English by Using a Test with Automatically-Generated Fill-in-the-Blank Questions"; english proficiency test using auto generated FIB questinos.pdf; Proceedings of the 2nd Workshop on Building Educational Applications Using NLP, pp. 61-68, Ann Arbor, Jun. 2005.*

* cited by examiner

AUTOMATED E-LEARNING AND PRESENTATION AUTHORING SYSTEM

BACKGROUND

1. Field of the Invention

The present invention relates to the development of e-learning tutorials and multimedia presentations and more particularly to a system for automatically generating e-learning tutorials and multimedia presentations, containing matching images from the system's image library, from a document or documents created by a word processor.

2. Background of the Prior Art

The beginnings of e-learning tutorials, or computer-based-training as it was then known, saw text-based tutorials presented on mainframe computer terminals. With the introduction of the personal computer and the ability to display graphics, various procedural languages were used to develop tutorials. Such projects were laborious programming tasks which were extremely time consuming and expensive to develop.

Next came authoring languages such as Author from Microcraft and TenCore from Computer Teaching Corporation which simplified the programming task through the use of programming languages dedicated to the task of producing electronic tutorials. These languages still required a high level of expertise to use and the time requirement and expense was still prohibitive to many who would otherwise have taken advantage of the technology.

Finally, in order to address the issues of time, skill and budget, the current array of objects oriented authoring systems and WYSIWYG editors have largely replaced the authoring and procedural languages of the past. These systems use a variety of metaphors and strategies to create hypermedia presentations and e-learning tutorials.

Typically, hypermedia presentations are interactively designed and manually created with hypermedia authoring tools. Various commercial hypermedia authoring tools adopt different interactive authoring paradigms. The representative presentation authoring tools are summarized as follows.

PowerPoint from Microsoft is based on a structure-oriented model and supports hierarchical information content authoring in a 2D layout. Many commercial word processing tools follow this authoring model. Documents are often developed in terms of hierarchical structures such as book, pages or slides, sections, subsections, etc., and WYSWIG user interfaces are provided to support structure editing and issue formatting commands interactively.

Authorware from Macromedia and IconAuthor from AimTech are based on a flowchart model and use icons representing events such as audio or video, if-then functions, branching and hyperlinks in a linear progression like flowchart control. Content editors to assign real media files and properties to each icon could be used. This model provides high-level program control and global ordering of information presentation.

Director from Macromedia, based on a time-line model, displays media sequences as tracks and specializes in synchronizing events. It can be used to create high-level multimedia presentations.

Multimedia Toolbook from Asymetrix, based on an object-oriented model with scripting capability, provides more support of complex interaction behaviour. Users can interactively enter document content (in multimedia objects) and define object properties including various formatting commands and scripts for object behaviour. This authoring tool allows the user to get to a lower-level control of object and system behaviour with script commands.

Despite their promise of greater development speed, shorter learning curves and lower costs, today's authoring systems for e-learning tutorial and hypermedia presentation development are still too cumbersome, too time consuming and therefore too expensive for many potential businesses to use. Consequently, very few small to medium sized enterprises and educational institutions take advantage of e-learning strategies for training staff and students.

All of these systems require the user to determine the location and format of text on each screen. All of these systems require the user to develop or select appropriate graphics for inclusion on screens and then position them correctly. All of these systems require the user to manually create learning activities and all of these systems require extensive testing of the resulting courseware. In short, none of the current systems available, solve the problem of excessive development time, and therefore cost, of developing e-learning courseware and hypermedia presentations.

OBJECTS AND ADVANTAGES

What is needed is a system that automates the creation of e-learning tutorials and electronic presentations such that all the subject matter expert need do is author the content using a word processor and the automated system does the rest; chunking the content into screens, selecting images to represent the content, developing learning activities, providing a navigational structure and interface, and delivering in an industry standard format which tracks end-user performance and results. Such a system should still provide flexibility and user customisation, if desired, but the pain-staking and repetitive task of screen-by-screen development would be undertaken by the system itself. The subject matter expert or course designer then would only need to review and/or edit the already completed course. Such a paradigmn shift sees the role of the user change from that of designer to that of editor. In effect the user begins at the end of the process. The present invention meets all of these requirements.

BRIEF DESCRIPTION OF THE FIGURES

The present invention may be better understood, and its numerous objects, features and advantages made apparent to those skilled in the art by referencing the accompanying drawings.

DETAILED DESCRIPTION

Figure 1:
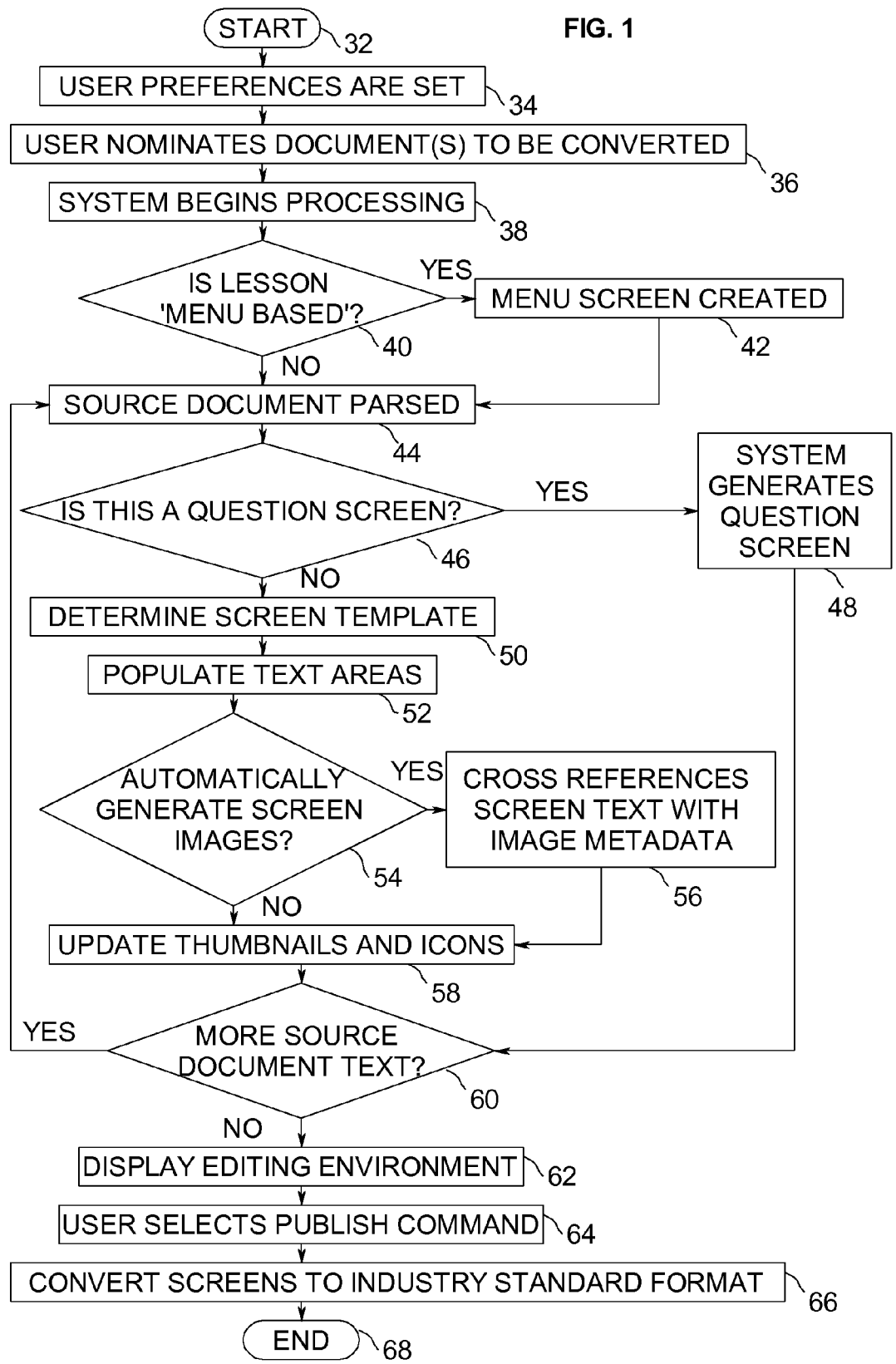
FIG. 1 is a process flow diagram illustrating the process by which the preferred embodiment is used to produce e-learning courseware in accordance with the present invention.

The following sets forth a detailed description of the best contemplated mode for carrying out the invention. The description is intended to be illustrative of the invention and should not be taken to be limiting.

A number of terms used in this description and document are defined as follows. Source documents refers to either a single text based document or a plurality of text based documents, such as Microsoft Word documents, which may or may not contain other media. The source document typically contains the content or subject matter which is ultimately displayed within the electronic screen based product. Electronic screens refers to any representation of data on a computer screen and includes electronic slides, screens, or pages. Electronic screen based product refers to e-learning tutorials, web based content generally, and electronic presentations such as Microsoft PowerPoint presentations.

This invention relates to the creation of e-learning tutorials (typically browser based), the publishing of internet based content and the development of electronic presentations (collectively described here as 'electronic screen based product').

The present invention automates the process of creating electronic screen based product by creating the draft screens itself (without the necessity for the user to tag where a screen should begin or end) and dynamically inserting relevant graphics onto each screen. A further function of the authoring system is to automatically create interactive activities which the tutorial student can complete and be assessed by. The user's role therefore changes from that of screen designer to screen editor as they analyse each screen and make changes as necessary. This change of role represents a significant time saving for the user.

In one form the invention allows the user to quickly create e-learning tutorials or simple html or xml browser-based content. In another form the invention allows the user to quickly create a series of presentation slides in Microsoft PowerPoint format. In both cases, the system processes data provided by the user, in a text file (typically in Microsoft Word format). It systematically copies text to a predefined template-based screen until that screen is populated with text. The amount of text allocated to a screen will be dependent on the specific screen template or templates and the font size and type chosen by the user. Once the text is allocated, the system will then analyse the text of each screen, cross referencing the text with metadata associated with the system's library of graphics seeking a matching image based on parameters set by the user. A matching image is then automatically inserted on the corresponding screen. If no matching images are found, the system randomly selects one. The system then does the same with the subsequent screen and continues in this manner until all text in the original source text file is allocated to a screen. The resulting screen-builds are visible to the user in order to show the progress of the automated conversion. The original source text file may or may not include other media types such as graphics, video, sound or animations. Depending on the parameters set by the user, or the system defaults, this additional media may also be incorporated on the appropriate screen. When the system is being used to create e-learning tutorials, the user may also have opted for the system to automatically create learning activities. These activities are automatically created at this time. Two types of learning activities can be automatically generated by the system. The first type, described here as 'Complete the Paragraph' questions are cloze activities. They consist of sentences with missing words which the tutorial student must "drag and drop" to the appropriate location. The system 'selects' a predetermined number of words, removing them from the paragraph and scrambling them for the user to then position correctly. In an alternative embodiment, the user could type in the missing words. The second type of automatically generated learning activities are multiple choice questions. In order for the system to generate these activities, the actual questions and options must be included within the source document for the system to 'pick up'. The system uses means to identify when a multiple choice question exists in the source document. Additionally, the correct answer must either be indicated in the source document or specified during the editing phase by the user.

An alternative approach would be to have the system allocate all text across a number of screen and then to return to each screen systematically inserting images in the manner described above.

For the user, use of the system would typically involve a three part procedure on the part of the user; set-up (1. Settings), document conversion (2. Import) and editing (3. Edit). In the preferred embodiment, a fourth and final step would be to publish (4. Publish) the completed e-learning tutorial, electronic presentation or web based content into the final delivery format.

In order to describe the preferred embodiment of the invention more fully and to describe an alternative embodiment, reference will now be made to the accompanying drawings.

FIG. 1 is a process flow diagram illustrating the process by which the preferred embodiment is used to produce e-learning courseware in accordance with the present invention. Box 34 identifies that the system user has the ability to alter various settings which influence the way the system generates the electronic screen based product. The preferred embodiment of the invention, however, is designed in such a way that the settings are optional for the user and the system defaults will be satisfactory for successful use of the system. Some of these settings are shown in detail in FIGS. 2-7.

Box 36 indicates that the user nominates either a single document or a number of documents that are to be converted. This is done using the Import screen shown in detail in FIG. 8. When the documents have been nominated, the user requests that the system begin the conversion process and the system begins processing, box 38.

In step 40, the system determines if the product is menu based or linear, which has been specified by the user on the Import screen. If the product is to be menu based, the system creates a menu screen, using the topic names identified by the user and automatically generating images to represent these names by cross referencing these names against metadata associated with a collection of images.

The system then parses the source document text, box 44. In step 46, the system then determines if the immediate text to be dealt with should be an automatically generated cloze (complete the paragraph) question or a multiple choice question. If so, the system generates a question screen of the appropriate type, box 48. If it is a multiple choice question, the actual question stem and options are found in the source document and directly imported and made interactive. In the case of complete the paragraph questions, the system displays a predetermined instruction on the created screen, together with the paragraph from the source document wherein a predetermined number of words have been omitted and scrambled such that the tutorial student is required to position them in the correct location by 'dragging and dropping'.

Figure 3:
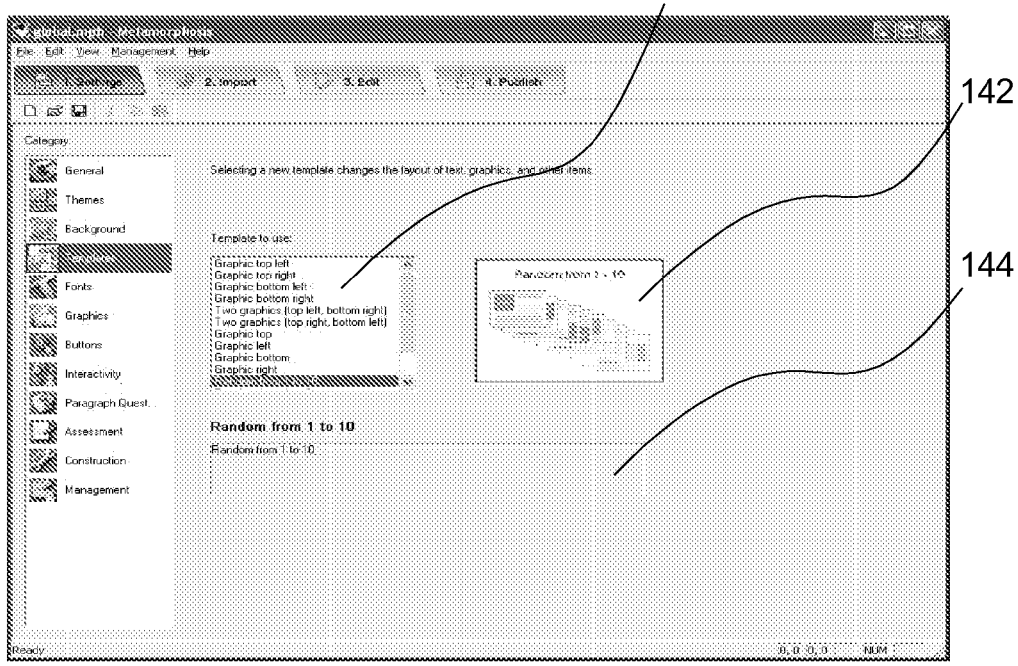
FIG. 3 shows an example of a Templates Settings screen found in the preferred embodiment of the present invention.

In box 50, the system chooses a screen template based on the template or group of templates nominated by the user or system default with the template settings, see FIG. 3. The system then populates the text areas on the current screen, box 52. Various rules are observed during this process. For example, sentences are fully completed without flowing over to the subsequent page and headings should not be displayed without text below them. The system then determines if it is required to automatically generate images for the screen, step 54. This is specified by the user on the Graphics Settings screen, FIG. 5 or by system default. If the system is required to automatically generate images for the screen, the system cross references text from the screen with image metadata and then insert the image onto the screen, Box 56. In order to determine which screen text to cross reference, the system may process one or more words, determined by their position within the sentence or paragraph. The system also refers to an exclusion list of commonly used words such as 'the', 'and' and 'she' which may detract from the effectiveness of the cross referencing system. If more than one matching image is found by the system, the selected image will either be chosen randomly or sequentially by the system depending on the user settings or system defaults, see FIG. 5. The screen template may require more than one image on the screen in which case the referencing and insertion process is repeated.

Once each screen is generated, the system updates the navigation thumbnails and tree-view icons, box 58. These thumbnails and icons are used for navigational purposes for the designer while editing the resulting product. Examples of thumbnails and tree-view icons are included in FIG. 9 and FIG. 10.

Figure 9:
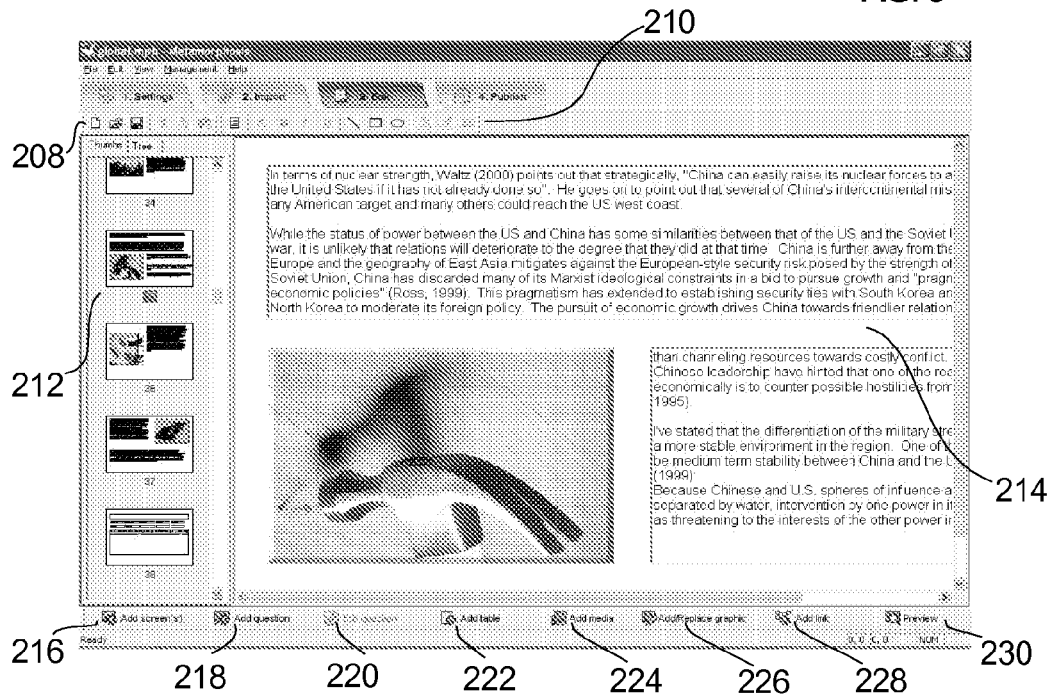
FIG. 9 shows an example of a Thumbnail-view Edit screen found in the preferred embodiment of the present invention.
Figure 10:
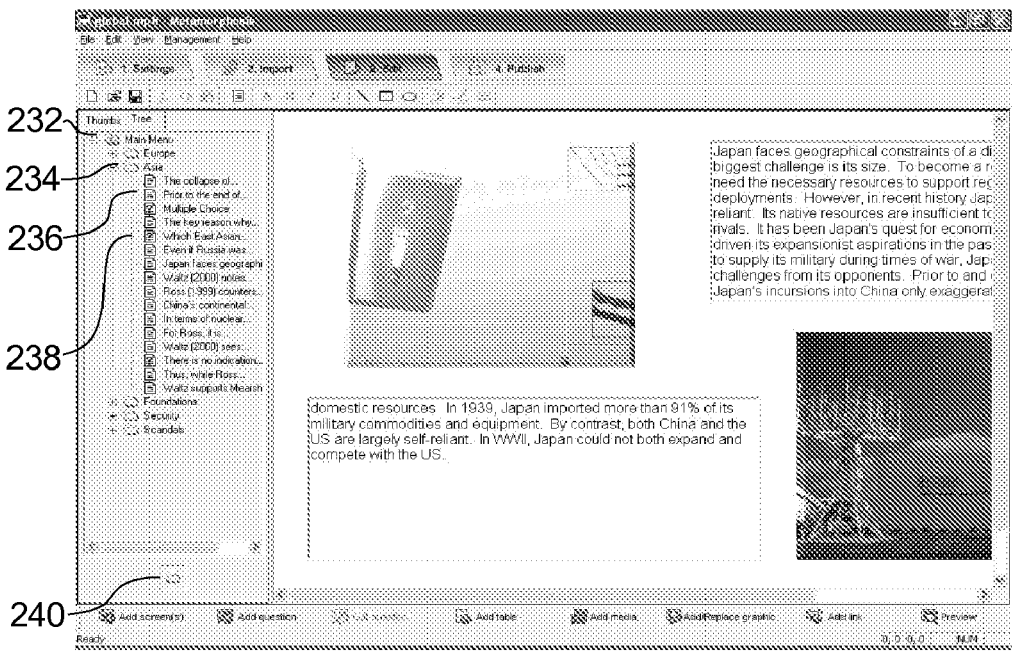
FIG. 10 shows an example of a Tree-view Edit screen found in the preferred embodiment of the present invention.

In step 60, the system determines if there is more source document text so far not inserted into existing screens. If so, the process continues to parse the text, box 44. If not, the conversion process is complete and the system displays the editing environment so that the user can make any required modifications including the ability to add new screens, questions, text, images and other media. An example of the editing environment is shown in FIG. 9 and FIG. 10.

When the user is ready they select the Publish command, box 64. Publishing means that the system converts the created screens into industry standard format, box 66, for viewing by the end user or tutorial student.

Figure 2:
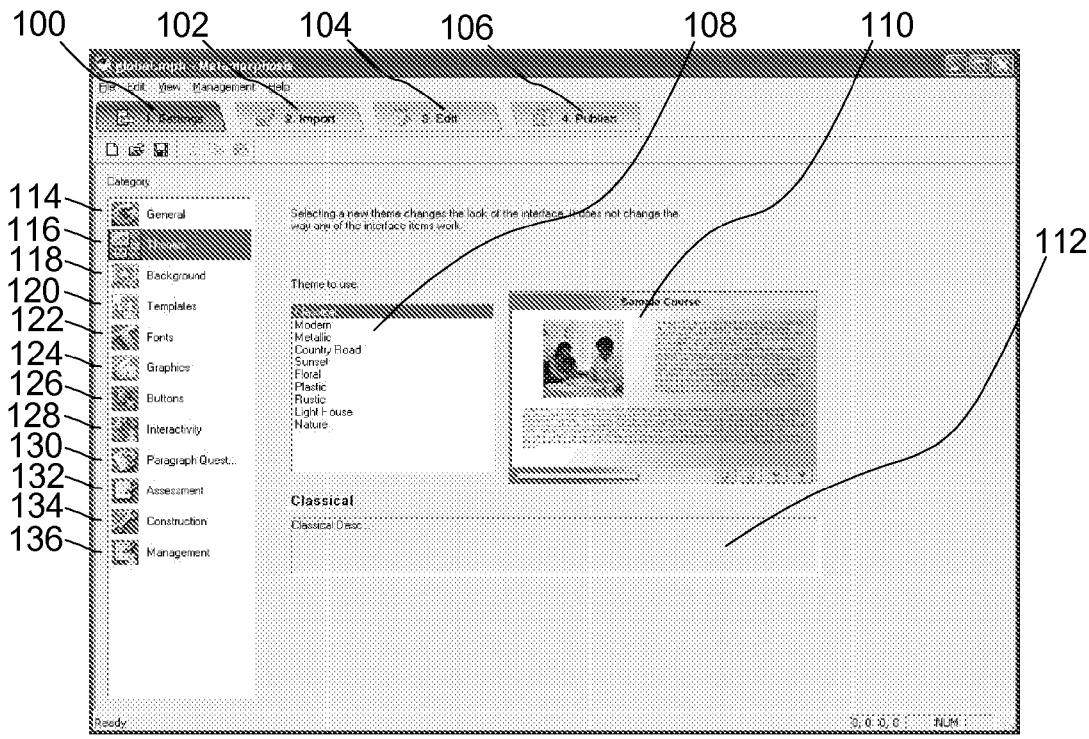
FIG. 2 shows an example of a Themes Settings screen found in the preferred embodiment of the present invention.

FIG. 2 shows an example of a Themes Settings screen found in the preferred embodiment of the present invention. The Theme Settings screen allows users to pick various different themes from Selection box 108, a sample of which is then displayed in Sample display 110 and a description provided in theme description area 112. A theme includes the various interface elements that comprise the completed courseware including background, colours, buttons, and display panels. Elements of the interface facilitate end-user navigation in resulting electronic screen based product.

Also available on this screen and all Settings screens is the ability to switch to all other Settings categories. General icon 114 takes the user to the General Settings screen where they can specify the course name, code and description. Themes icon 116 takes the user to the current screen. Background icon 118 takes the user to the Background Settings screen, which allows users to make additional changes to the chosen theme. Templates icon 120 takes the user to the Templates Settings screen (refer to FIG. 3). Fonts icon 122 takes the user to the Fonts Settings screen (refer to FIG. 4). Graphics icon 124 takes the user to the Graphics Settings screen (refer to FIG. 5). Interactivity icon 128 takes the user to the Interactivity Settings screen where the user can determine how the system will generate interactive questions. For example, on this screen they can specify the number of attempts a tutorial student may make at a question. This screen is also used to specify whether feedback is provided to the tutorial student following their attempt or not. Paragraph Questions icon 130 takes the user to the Paragraph Questions Settings screen (refer to FIG. 6). Assessment icon 132 takes the user to the Assessment Settings screen where the user can nominate the final lesson topic as a dedicated assessment topic and determine how the assessment should operate. Here, for example, they can specify a time limit per screen or across a series of screens. Construction icon 134 takes the user to the Construction Settings screen (refer to FIG. 7). Management icon 136 takes the user to the Management Settings screen where the user can enable the sign-in system for the created electronic screen based product and specify the nature and method of recording end user progress and results.

Also available on this screen and all other system screens is the ability to switch between the main system tabs. Settings Tab button 100, takes the user to the Settings screens. Import Tab button 102 takes the user to the Import screen (refer to FIG. 8). Edit Tab button 104 takes the user to the Edit screen (refer to FIG. 9 and FIG. 10). Publish Tab button 106 takes the user to the Publish screen (refer to FIG. 11).

FIG. 3 shows an example of a Templates Settings screen found in the preferred embodiment of the present invention. The Template Settings screen allows users to nominate a template or collection of templates that the system will use when automatically generating screens from the source text document(s). The user makes their selection from selection box 140, an indicative illustration of which is then displayed in Sample display 142 and a description provided in template description area 144.

Figure 4:
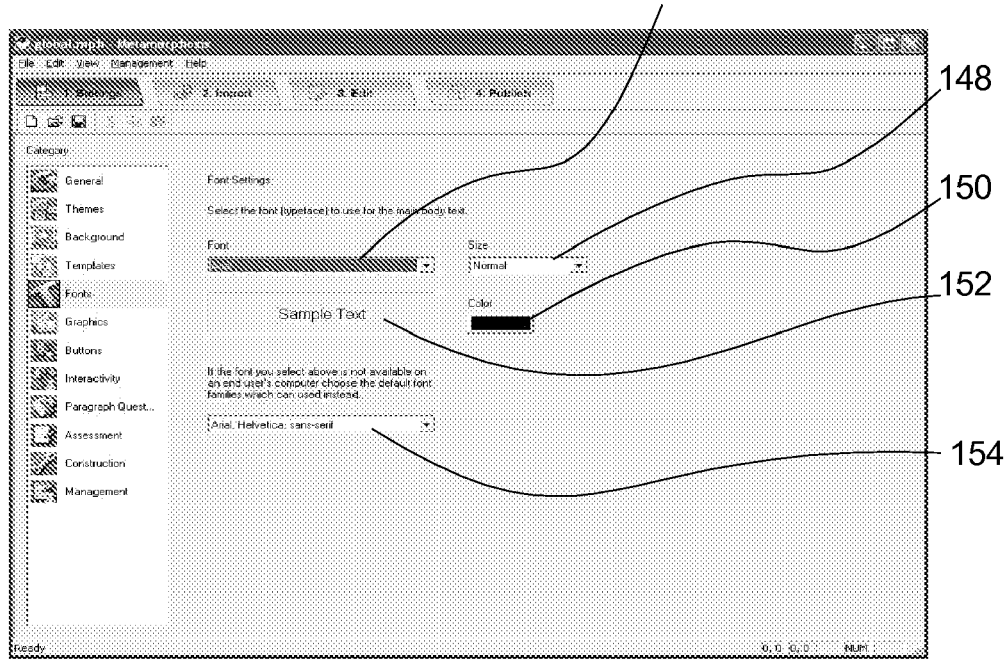
FIG. 4 shows an example of a Fonts Settings screen found in the preferred embodiment of the present invention.

FIG. 4 shows an example of a Fonts Settings screen found in the preferred embodiment of the present invention. The Fonts Settings screen allows users to select the main font to appear on display screens. Users determine the font using font selection box 146, the size using size selection box 148 and the colour using colour selection box 150. The resulting text appearance is shown in sample text display area 152.

Figure 5:
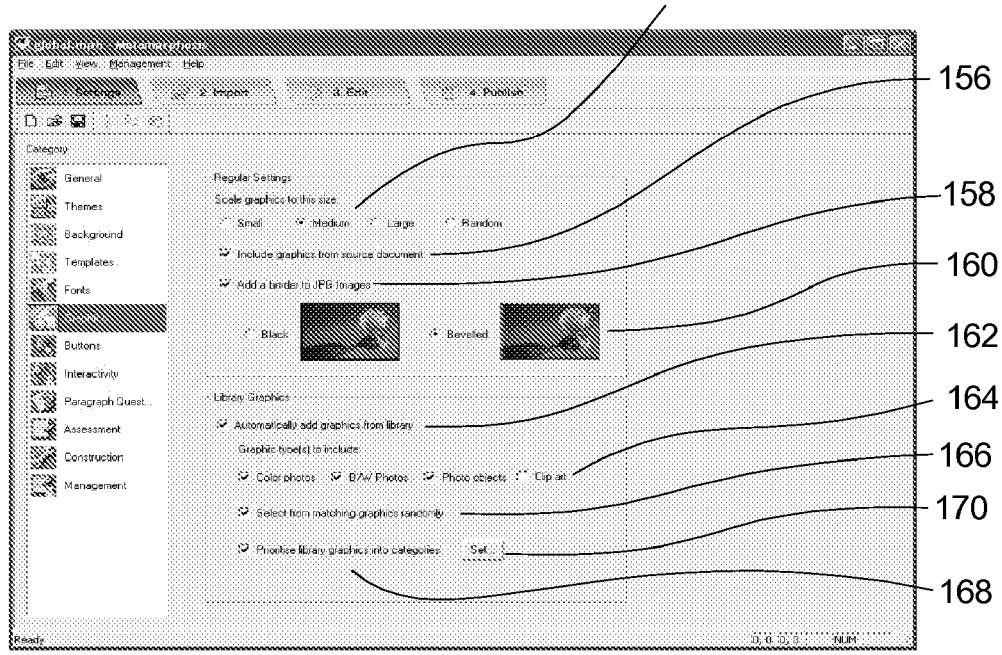
FIG. 5 shows an example of a Graphics Settings screen found in the preferred embodiment of the present invention.

FIG. 5 shows an example of a Graphics Settings screen found in the preferred embodiment of the present invention. The Graphics Settings screen allows users to specify the size of images to be included by making a selection from the graphic size selection area 154. Here users can also nominate if graphics or other media found in the source document should be included in the resulting screens by checking checkbox 158. Users can also opt for the system to generate images with a border at checkbox 158 and specify the type of border in border type selection area 160. Checkbox 162 allows the user to nominate if the system should automatically generate screen graphics from the system library. Users can then specify the type or types of images they wish the system to include from graphic type selection area 164. Normally the system will randomly select from matching images, however, by un-checking checkbox 166, the system will instead insert the first match found. Finally, at checkbox 168 the user can opt for the system to prioritise its graphics insertion according to various categories. These categories include Agriculture & Industry, Architecture, Business, Commerce & Trade, Education, Food & Beverages, Health & Safety, Holidays & Special Occasions, House & Home, Lifestyles & Cultures, Nature, People, Religion, Myth & Fantasy, Science & Technology, Signs & Symbols, Social Issues & Government, Sports & Leisure, Transportation, Travel & Tourism, and Wildlife & Animals. Using category selection button 170, the user may choose any or all of these categories in order to direct the system to first check these categories in sequence for matches before searching within other categories.

Figure 6:
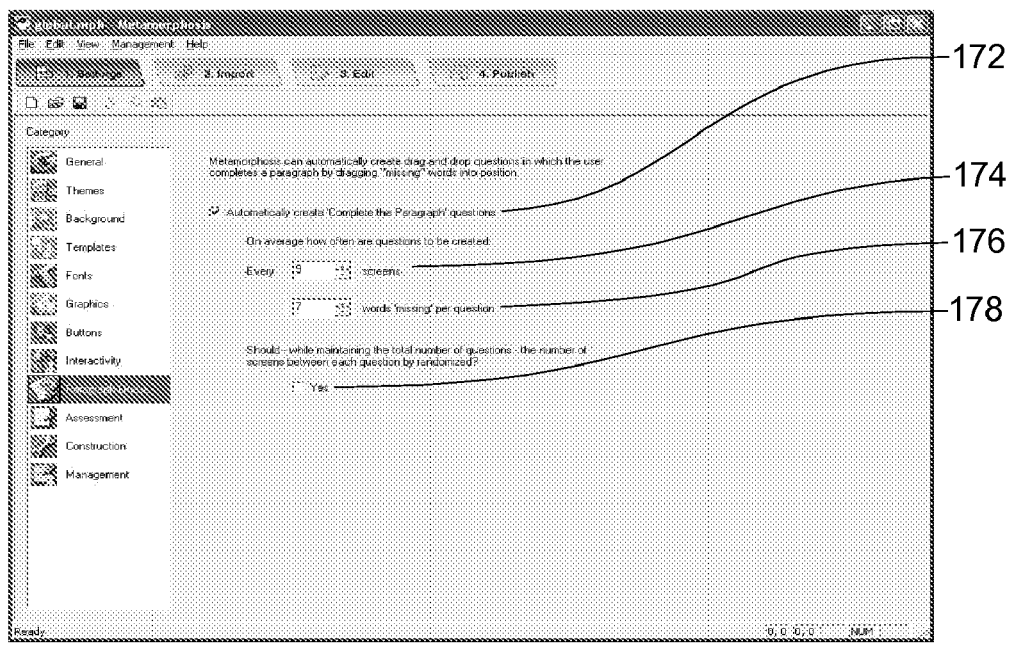
FIG. 6 shows an example of a Paragraph Questions Settings screen found in the preferred embodiment of the present invention.

FIG. 6 shows an example of a Paragraph Questions Settings screen found in the preferred embodiment of the present invention. The Paragraph Questions Settings screen allows users to direct the system to automatically generate complete the paragraph questions using checkbox 172. These are cloze type questions where the system displays a predetermined instruction on the created screen, together with the paragraph from the source document wherein a predetermined number of words have been omitted and scrambled such that the tutorial student is required to position them in the correct location by 'dragging and dropping'. Users can alter the value of screen frequency box 174 in order to determine how often these questions are generated. Users can alter the value of omitted word number box 176 in order to direct the system how many words are to be omitted and then scrambled. Checkbox 178 allows the user to randomise the frequency of presented complete the paragraph questions while still maintaining the same number of total questions generated.

Figure 7:
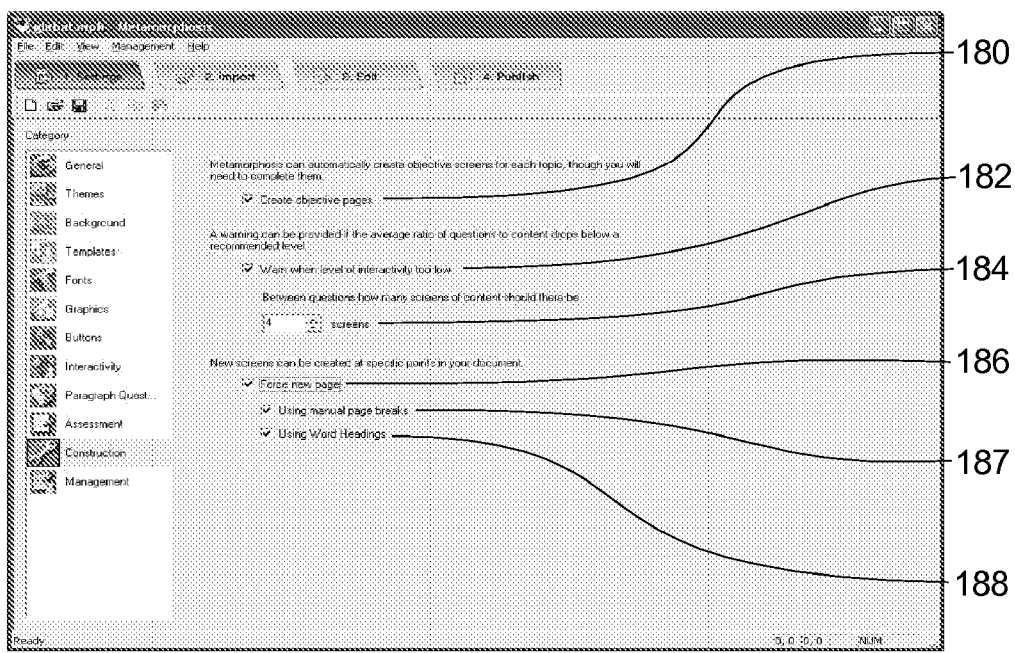
FIG. 7 shows an example of a Construction Settings screen found in the preferred embodiment of the present invention.

FIG. 7 shows an example of a Construction Settings screen found in the preferred embodiment of the present invention. The Construction Settings screen allows users to modify the way the system generates screens. Checkbox 180 allows the user to direct the system to automatically generate objective pages which introduce each courseware topic and provide the tutorial student with an estimate of the likely time required to complete the topic. When checkbox 182 is checked, the system will notify the user, at the point of publishing, if the ratio of question screens to regular screens is fewer than the value shown in interactivity frequency box 184. Checkbox 186 allows users to direct the system to force a new screen when the system encounters manual page breaks, checkbox 186, and/or Word heading styles, checkbox 188, in the source document.

Figure 8:
FIG. 8 shows an example of an Import screen found in the preferred embodiment of the present invention.

FIG. 8 shows an example of an Import screen found in the preferred embodiment of the present invention. The Import screen allows users to nominate the source document or documents which are to be converted by the system. If the lesson to be created is of a linear nature and does not have component topics, the user checks checkbox 190 and locates the source document using browse button 194. The resulting file name is then shown in display box 192. If the user wishes for component questions within the lesson to constitute a final assessment result for the student, the user must check checkbox 198. If the lesson to be created is to be menu based and has component topics, the user checks checkbox 198. The user then provides a name for each topic in text column 200 and locates the corresponding file using browse and display column 202. If the user wishes for component questions within the nominated topic to be included in a final assessment result for the student, the user must check the corresponding checkbox in checkbox column 204. When the student has completed the nomination of topic names and corresponding source documents, they click on import documents button 206. The system then begins to process the documents as described in FIG. 1 from box 38.

FIG. 9 shows an example of a Thumbnail-view Edit screen found in the preferred embodiment of the present invention.

The Edit screen enables users to modify the screens that the system has automatically generated and also to add new topics, screens, text, images, other media and functionality. Toolbar 208 allows for standard application functions such as open, save, create a new project, copy, cut and paste. Drawing toolbar 210 allows users to add text areas and vector type shapes to project screens. Thumbnails 212 provide graphical representations of each screen. Users may use these thumbnails to first select a screen before editing. Thumbnails will dynamically update after user changes are made to the corresponding screen. Display screen 214 shows the actual screen that is subject to editing.

Add screen(s) button 216 allows the user to add a new screen at the current location or to import and convert a new source document into the current project. Users have the option of determining whether a new source document should constitute a new topic within the lesson or be added to the current part of the lesson.

Add question button 218 allows users to select from a variety of question types to insert as a new screen. Once selected, a dialogue box for the chosen question type is displayed and completed by the user. Question types include multiple choice, complete the paragraph drag and drop cloze activities, text entry questions, part identification questions (where users must click on part of an image) and match the pairs questions (where users must 'draw' a line between pairs of corresponding words/items).

Edit question button 220 allows users to retrieve the question build dialogue box for questions that already exist to be edited.

Add table button 222 allows users to add a text area in tabular format. Users can nominate the number of columns and rows and then resize them as required.

Add media button 224 allows users to add a variety of media types to the screen. Media types supported include video in a variety of formats, audio in a variety of formats and Macromedia flash files.

Add/replace graphic button 226 allows users to either add or replace graphics. A dialogue box is displayed where the user can nominate keywords, type of image, category of image, and image size. Users can then insert the required image from any which match the user's criteria.

Add link button 228 allows users to associate text or graphics in the form of a link to other screens within the project or to an external internet or intranet URL.

Preview button 230 allows users to preview the current screen as it will appear in the finally published form. In preview mode, the screen is shown with the selected theme (refer to FIG. 2) and interface elements in place.

FIG. 10 shows an example of a Tree-view Edit screen found in the preferred embodiment of the present invention. Tree-view is an alternate representation of project screen to thumbnail view. In tree view, screens are represented by labelled icons. Icon types vary in appearance and include display screen icons (see display screen icon 236), question screen icons (see question screen icon 238), menu folder icons (see menu folder icon 232) and container folder icons (see container folder icon 234). Users can change the hierarchical structure and/or sequence of the screens by dragging icons to new locations. In this way they can also create submenus. When a display screen icon is dragged to the right of another display screen icon, the latter display screen icon transforms to a menu folder screen and a link to the new subordinate screen is established. Users can also create new container folders by clicking and dragging new folder icon 240 onto the icon flowline. Container folders are not screens themselves but notional groupings of screens contained within them.

Figure 11:
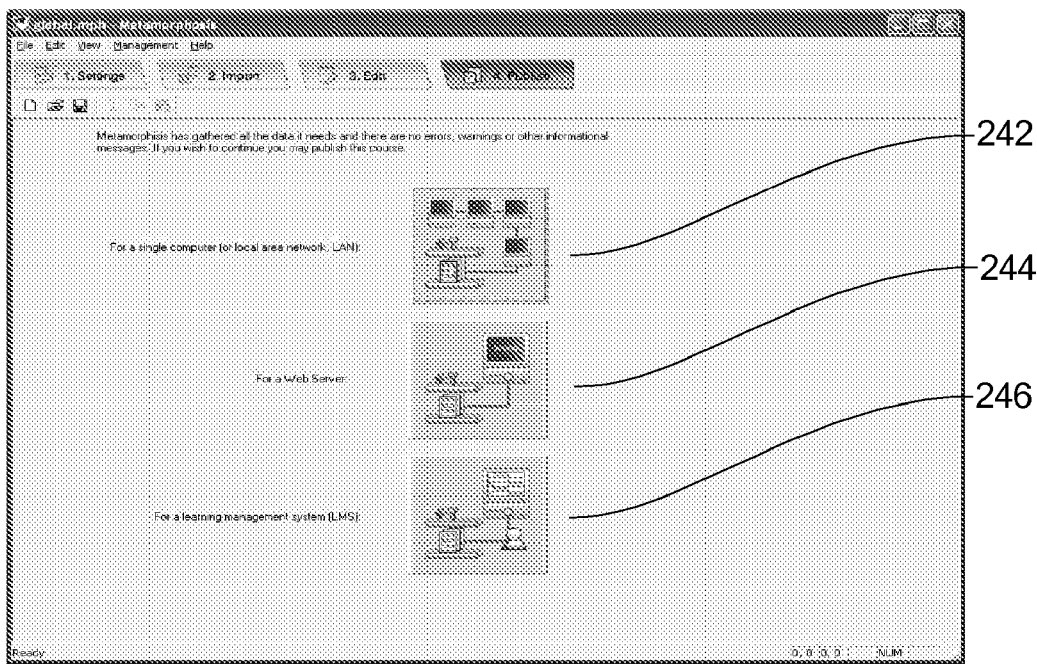
FIG. 11 shows an example of a Publish screen found in the preferred embodiment of the present invention.

FIG. 11 shows an example of a Publish screen found in the preferred embodiment of the present invention. The Publish screen enables users to publish the tutorial screens in industry standard browser based code to enable a runtime environment for tutorial students. Users can opt to publish the completed lesson for use on a stand-alone computer or local area network using button 242, or for use on a web server using button 244, or for a SCORM compliant learning management system using button 246.

Figure 12:
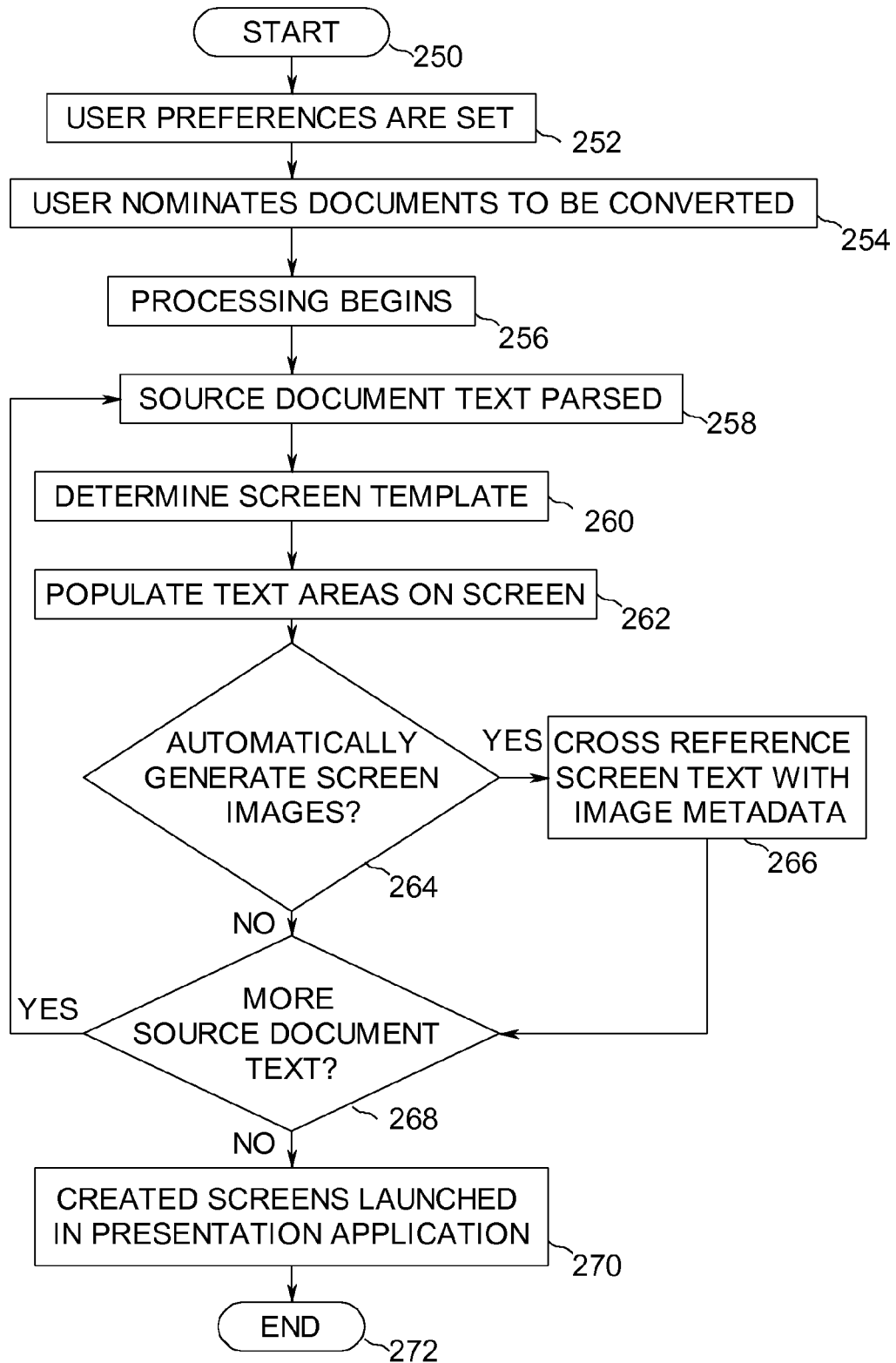
FIG. 12 is a process flow diagram illustrating the process by which an alternative embodiment is used to produce an electronic presentation in accordance with the present invention.

FIG. 12 is a process flow diagram illustrating the process by which an alternative embodiment is used to produce an electronic presentation in accordance with the present invention.

Box 252 identifies that the system user has the ability to alter various settings that influence the way the system generates the electronic screen based product. The alternative embodiment of the invention, however, is designed in such a way that the settings are optional for the user and the system defaults will be satisfactory for successful use of the system. Some of these settings are similar to that of the preferred embodiment shown in detail in FIGS. 2-7.

Box 254 indicates that the user nominates either a single or multiple documents to be converted. When the document has been nominated, the user requests that the system begin the conversion process and the system begins processing, box 256.

The system parses the source document text, box 258. In box 260, the system chooses a screen template based on the template or group of templates nominated by the user or system default with the template settings. The system then populates the text areas on the current screen, box 262. Various rules are observed during this process. For example, sentences are fully completed without flowing over to the subsequent page and headings should not be displayed without text below them. The system then determines if it is required to automatically generate images for the screen, step 264. This is specified by the user on the Graphics Settings tab or by system default. If the system is required to automatically generate images for the screen, the system cross references text from the screen with image metadata and then insert the image onto the screen, Box 266. In order to determine which screen text to cross reference, the system may process one or more words, determined by their position within the sentence or paragraph. The system also refers to an exclusion list of commonly used words such as 'the', 'and' and 'she' which may detract from the effectiveness of the cross referencing system. If more than one matching image is found by the system, the selected image will either be chosen randomly or sequentially by the system depending on the user settings or system defaults. The screen template may require more than one image on the screen in which case the referencing and insertion process is repeated.

In step 268, the system determines if there is more source document text so far not inserted into existing screens. If so, the process continues to parse the text, box 258. If not, the conversion process is complete and the system launches the completed presentation in the third party application, box 270, which includes an editing environment so that the user can make any required modifications including the ability to add new screens, text, images and other media.

Figure 13:
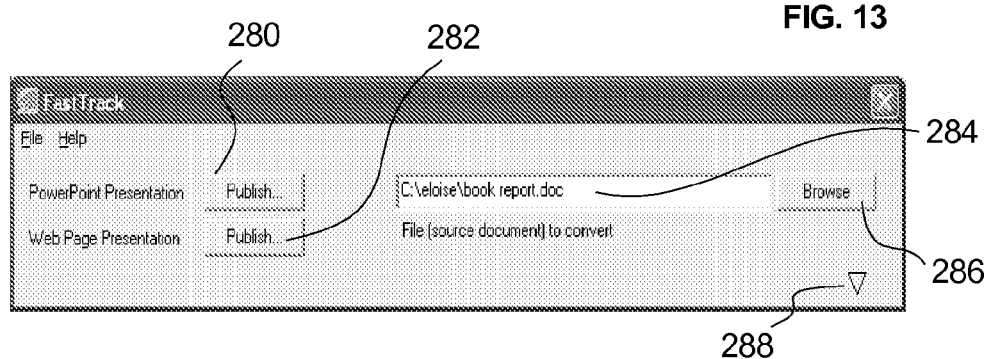
FIG. 13 shows an example of a basic interface found in an alternative embodiment of the present invention.

FIG. 13 shows an example of a basic interface found in an alternative embodiment of the present invention. This minimal interface allows the user to select a document for conversion using browse button 286, the name of which is then shown in Display area 284. The user may then choose to publish the presentation as either a Microsoft PowerPoint project, using button 280 or as a web browser based presentation using button 282. In the case of PowerPoint presentations, the system creates the sequence by sending commands to PowerPoint itself during construction. Consequently, users actually view PowerPoint being launched and each subsequent screen being added to the new project. Expand button 288 expands the interface, to that described in FIG. 14, so that users may set various system parameters.

Figure 14:
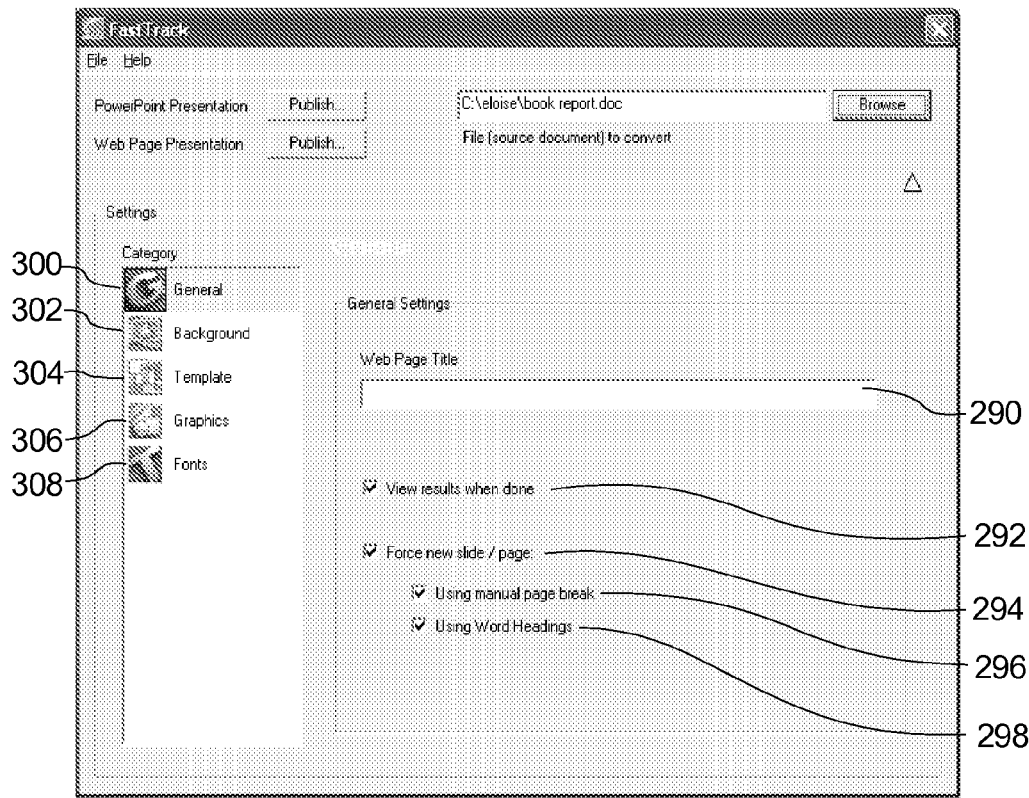
FIG. 14 shows an example of an expanded interface found in an alternative embodiment of the present invention.

FIG. 14 shows an example of an expanded interface found in an alternative embodiment of the present invention. The screen depicted by FIG. 14 retains the same functionality as that depicted by FIG. 13 as well as additional settings categories. Icon 300 allows users to set general settings such as whether the completed presentation should be launched automatically, checkbox 292, and whether the system should force new screens when manual page breaks or Word heading styles are encountered in the source document, checkboxes 292-294. Other settings categories include; background settings, icon 302, which allows users to choose an image or colour for the presentation background; template settings, icon 304, which allow users to choose from various layout options for text and images (in the same manner as FIG. 3); graphics settings, icon 306, which allow users to choose the type and presentation of the images to be included in the presentation (in the same manner as FIG. 5); and font settings, icon 308, which allow users to choose the main presentation font type, style, size and colour (in the same manner as FIG. 4).

What is claimed is:

1. A process for creating and using an electronic screen based product, said process comprising:

importing untagged source documents and automatically converting the source documents into a plurality of discrete electronic screens, which collectively form the electronic screen based product;

creating each of the electronic screens based upon one or more templates, wherein the one or more template are either user selected or selected by default, wherein each electronic screen is created by populating the one or more templates with text data from the source documents;

analyzing text in each of the electronic screens and automatically inserting an image into the electronic screen, wherein the insertion of the image is based upon the analyzed text;

automatically analyzing the electronic screens and automatically generating questions based upon the analyzed electronic screens;

presenting a graphical user interface that allows a user to edit the electronic screens and add additional electronic screens to the electronic screen based product;

publishing the electronic screen based product for use on a sharable content object reference model (SCORM) compliant learning management system; and communicating end user progress and performance to a database.

2. The process of claim 1, wherein, based on process defaults or user selection, existing source document media are incorporated by the process into said electronic screens.

3. The process of claim 1, wherein the nature of said discrete electronic screens are determined by user selected or default templates, fonts, and image types, sizes and categories.

4. The process of claim 1, wherein new discrete electronic screens are forced, based on user selected or system defaults, when the system encounters page breaks within the source document.

5. The process of claim 1, wherein new discrete electronic screens are forced, based on user selected or product defaults, when the process encounters predetermined heading styles within the source document.

6. The process of claim 1, wherein paragraphs or sentences, determined by process defaults or user settings, from said discrete electronic screens, are automatically converted into interactive cloze activities.

7. The process of claim 1, wherein end user navigation of said discrete electronic screens is facilitated by predefined, user selected navigational interfaces or schemes.

8. The process of claim 1, wherein a user menu electronic screen is automatically generated which provides end user access to the topics contained within said electronic screen based product.

9. The process of claim 1, wherein any hierarchical relationship that exists between said electronic screens can be manipulated, in terms of end user navigation, using a graphical user interface included within the process.

10. The process of claim 1, wherein said discrete electronic screens, collectively forming an electronic screen based product is published by the process for use on a stand alone computer or a local area network.

11. The process of claim 10, wherein said published electronic screen based product communicates end user progress and performance to a database which can be referenced by said published electronic screen based product itself and by the courseware designer, and anyone who has been provided with the appropriate access.

12. The process of claim 1, wherein said discrete electronic screens, collectively forming an electronic screen based product is published by the process for use on a web server for internet or intranet use.

13. The process of claim 12, wherein said published electronic screen based product communicates end user progress and performance to a database which can be referenced by said published electronic screen based product itself and by the courseware designer, and anyone who has been provided with the appropriate access.

14. The process of claim 1, wherein the process processes said source documents into said discrete electronic screens by sending commands and data to a predefined third party presentation slideshow authoring system.

15. The process of claim 1, wherein the format of said discrete electronic screens produced are compatible with and can be edited by a predefined third party presentation slideshow authoring product.

* * * * *